United States Patent [19]

Dauvergne

[11] 4,254,691
[45] Mar. 10, 1981

[54] ASSISTED STEERING DEVICE FOR A VEHICLE

[75] Inventor: Jean L. R. Dauvergne, Fosses, France

[73] Assignee: Societe Anonyme Francaise du Ferodo, Paris, France

[21] Appl. No.: 14,032

[22] Filed: Feb. 22, 1979

[30] Foreign Application Priority Data

Feb. 23, 1978 [FR] France .............................. 78 05160

[51] Int. Cl.³ .............................................. B62D 5/06
[52] U.S. Cl. ...................................... 91/467; 180/148
[58] Field of Search ................ 91/467, 315, 327, 345, 91/349, 352; 180/148

[56] References Cited

U.S. PATENT DOCUMENTS

| | | | |
|---|---|---|---|
| 2,139,391 | 12/1938 | Tibbetts | 91/467 X |
| 2,984,215 | 5/1961 | Charlson | 91/467 |
| 2,997,984 | 8/1961 | Ostwald | 91/467 |
| 3,528,521 | 9/1970 | Ellis | 91/467 X |
| 3,735,832 | 5/1973 | Akima | 180/148 |

Primary Examiner—Edward J. McCarthy
Attorney, Agent, or Firm—Young & Thompson

[57] ABSTRACT

An assisted steering device for a vehicle has a steering column in two parts which are capable of limited relative angular play, permitting angular offsetting of the parts under the effect of the steering wheel. This enables two rotor discs, movable respectively with the two parts, to be offset relative to each other. These discs are located between two stators formed with annular grooves, and one of the discs has a circular series of passages which extend over a mean radius the value of which is between the values of the mean radii of two circular series of passages provided in the other disc.

22 Claims, 18 Drawing Figures

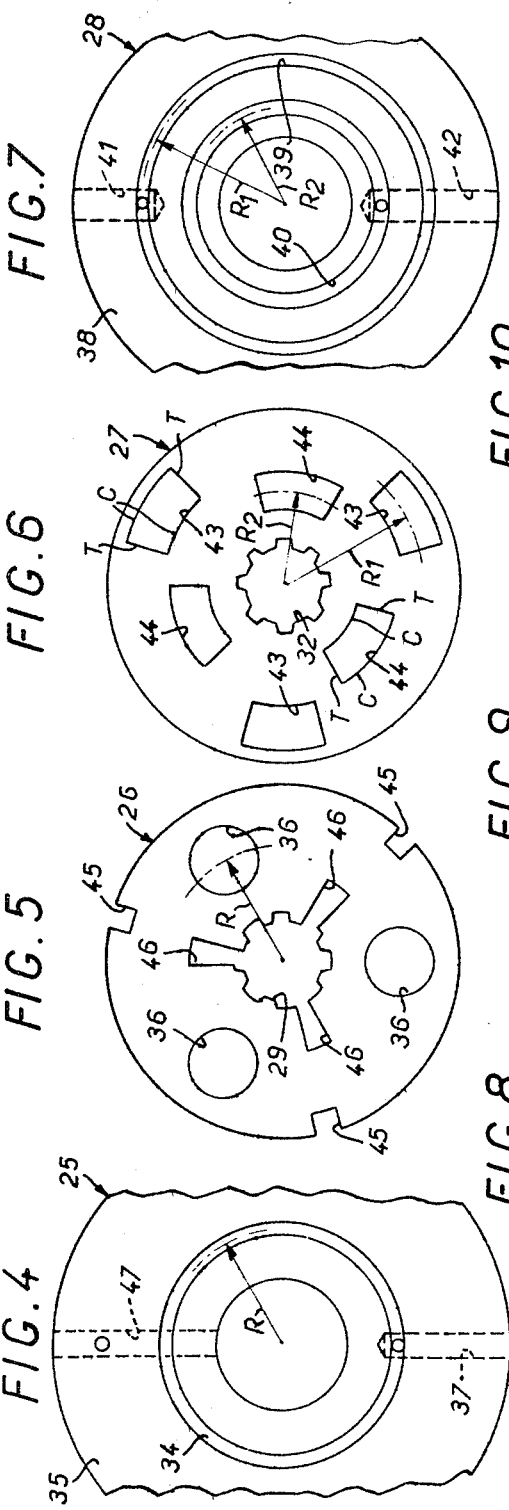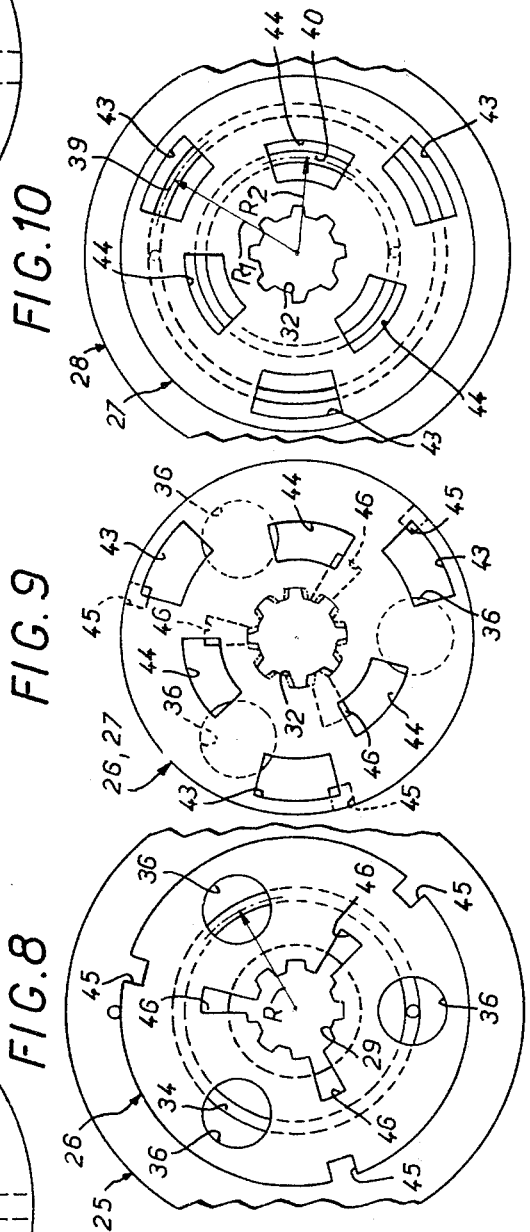

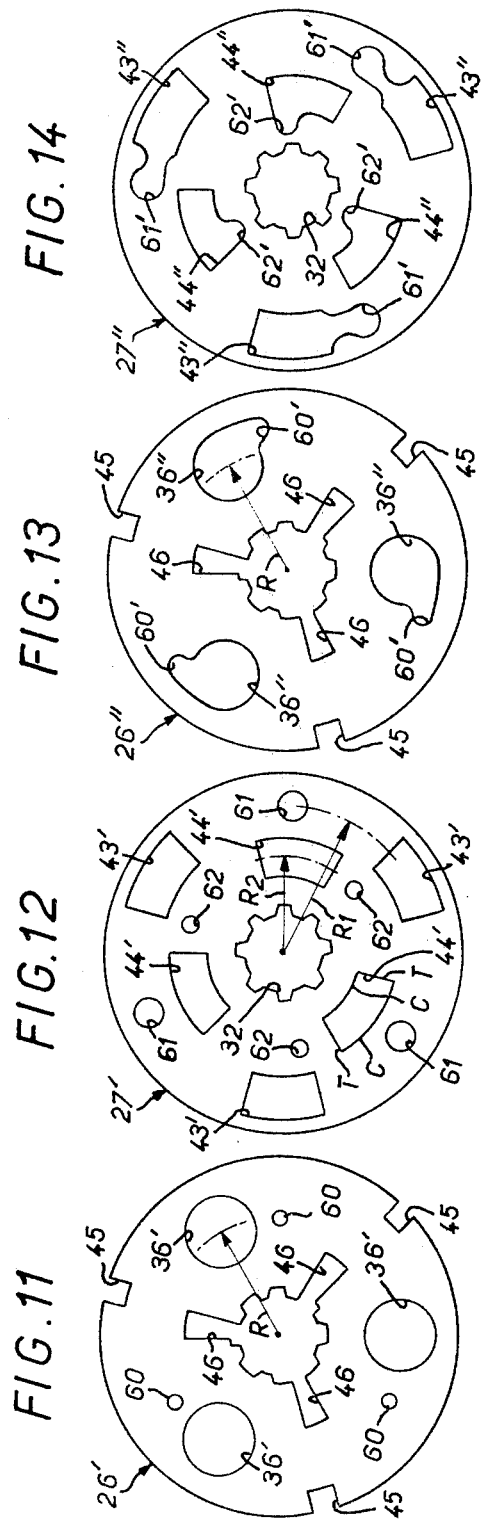

4,254,691

ASSISTED STEERING DEVICE FOR A VEHICLE

BACKGROUND OF THE INVENTION

This invention relates to an assisted steering device for a vehicle, comprising control means acting on direction changing means, the said control means having a transmission element in two parts which are capable of limited relative angular movement which permits angular offsetting of the said parts under the action of the said control means, and assistance means which, in response to such angular offsetting, are operable to act on the direction changing means in the same sense as the control means.

The invention relates more particularly to a device of this kind in which the said assistance means comprise a hydraulic station, a hydraulic jack acting on the said direction changing means and a hydraulic distributor interposed between the station and the jack.

The invention relates more particularly to a distributor of the type comprising an axial stack consisting of a first stator, a first rotor disc integral in rotation with one of the two parts of the transmission element, a second rotor disc integral in rotation with the other part of the transmission element, and a second stator, the first stator being supplied by the said hydraulic station, the first rotor disc having a series of passages, the second rotor disc having two series of passages, and the second stator supplying the said hydraulic jack.

The known devices of this kind are generally complex in construction, requiring the use of a balancing or equilibrating piston and elastic means for taking up the play along the interfaces between the stators and rotors, which means that, in particular, the stator associated with the hydraulic station has to be mounted so as to slide in an axial direction. Despite such structural arrangements, the rotor discs are thick and badly balanced and are found to suffer from operational difficulties. Moreover, the rotors have to be machined differently on each of their two surfaces, thus making manufacture more complicated.

The invention provides an assisted steering device for a vehicle which does not suffer from these disadvantages, which is extremely simple in construction and which operates satisfactorily in a perfectly balanced manner.

SUMMARY

According to the invention, an assisted steering device for a vehicle of the type indicated above is characterised in that the passages in at least one of the two rotor discs, and preferably in both of the rotor discs, are cylindrical holes extending from one surface of the disc to the other, and that annular groove means are provided in the surface of the stator adjacent to the said rotor disc and extending opposite the said cylindrical holes.

The term cylindrical hole should be taken to mean a hole which is defined by a cylindrical surface and whose section, perpendicular to the axis of the distributor, is circular or otherwise, and remains constant from one end of the hole to the other.

As a result of this arrangement, the rotor discs can conveniently be produced using a punch, e.g. by pressing them from flat sheet metal, so that large numbers can be manufactured economically by mass production without further machining.

According to another preferred feature of the invention, the series of passages of the first rotor disc and the two series of passages of the second rotor disc are all circular series with three different mean radii. Preferably, the means radius relating to the first rotor disc is between those relating to the second rotor disc.

This arrangement makes it possible for each of the rotor discs to be separately axially balanced or equilibrated, so that no substantial axial force tends to displace it in one direction or another, at any time, either when the assistance is in operation or when it is not in operation.

For this purpose, it is merely necessary to satisfy the following conditions, which are easily fulfilled:

(1) The sum of the areas, over the section perpendicular to the axis of the distributor, of the passages of one of the series of passages of the second rotor disc is equal to the sum of the areas, over the sections perpendicular to the axis of the distributor, of the passages of the other series of passages of the second rotor disc.

(2) The annular groove of the first stator has an area, over an annular section perpendicular to the axis of the distributor, which is equal to the sum of the areas, over a section perpendicular to the axis of the distributor, of the cylindrical holes of one of the series of cylindrical holes of the second rotor disc, which is in turn equal to the sum of the areas, over a section perpendicular to the axis of the distributor, of the cylindrical holes of the other series of cylindrical holes of the second rotor disc.

(3) The two annular grooves of the second stator have the same area, over an annular section perpendicular to the axis of the distributor.

(4) The sum of the areas, over a section perpendicular to the axis of the distributor, of the cylindrical holes of the first rotor disc is equal to the area, over an annular section perpendicular to the axis of the distributor, of each of the annular grooves of the second stator.

This set of conditions makes it possible to achieve equilibrium under all operational conditions. When the assistance is active, the high pressure of the hydraulic station corresponds to the desirable condition of being equal to the pressure developed in one or other of the chambers of the jack, whereas, when the assistance is inactive, the low residual pressure of the station corresponds to the desirable condition of being equal to the sum of the low residual pressures in the two chambers of the jack.

Owing to the equilibration of the rotor discs, there is no need to provide a balancing piston or to exert an elastic axial force to keep the rotor discs in position against each other, and according to another feature of the invention, the axial stacking of the two rotor discs between the two stators, which are held at a constant spacing, preferably via a spacing means, is effected with gentle friction, with a predetermined tolerance, e.g. of the order of 1/100 mm.

A construction of this kind, which is considerably simplified since it has no joints or means for taking up the play, gives excellent results. Furthermore, the rotor discs may be thin, which means that, for a given distance between the stators, it is possible to have one very thin rotor disc and to make the other one thicker to ensure a rigid connection between the two parts of the transmission in case the assistance breaks down.

The device according to the invention advantageously comprises means for improving the conditions of equilibration of the pressure, which is a particularly useful feature when the pressure of the station is high.

For this purpose, auxiliary holes may be provided in the rotors and are either independent of the hydraulic passages or consist of hydraulic passages themselves, enlarged for this purpose.

In order to improve the conditions of pressure equilibration, the functions of the various stators and rotors may also be duplicated. In this case, each stator comprises three grooves and each rotor comprises three series of hydraulic passages.

BRIEF DESCRIPTION OF THE DRAWINGS

FIG. 4 is a view of the surface of the first stator adjacent to the first rotor;

FIG. 5 is an elevation of the first rotor;

FIG. 6 is an elevation of the second rotor;

FIG. 7 is a view of the surface of the second stator adjacent to the second rotor;

FIG. 8 shows the interface between the first stator in FIG. 4 and the first rotor in FIG. 5;

FIG. 9 shows the interface between the first rotor in FIG. 5 and the second rotor in FIG. 6;

FIG. 10 shows the interface between the second rotor in FIG. 6 and the second stator in FIG. 7;

FIGS. 11 and 12 are views analogous to FIGS. 5 and 6 but show a variant in which the rotors have balancing holes, which are distinct from the hydraulic passages;

FIGS. 13 and 14 are views analogous to FIGS. 11 and 12 showing another variant wherein the balancing holes consist of the hydraulic passages themselves, enlarged for this purpose;

FIGS. 16 and 17 show an elevation of the two rotors of the device in FIG. 15;

FIG. 18 shows an elevation of these two rotors superimposed, to illustrate the method of communication of the hydraulic passages.

DESCRIPTION OF THE PREFERRED EMBODIMENTS

Figure 1:
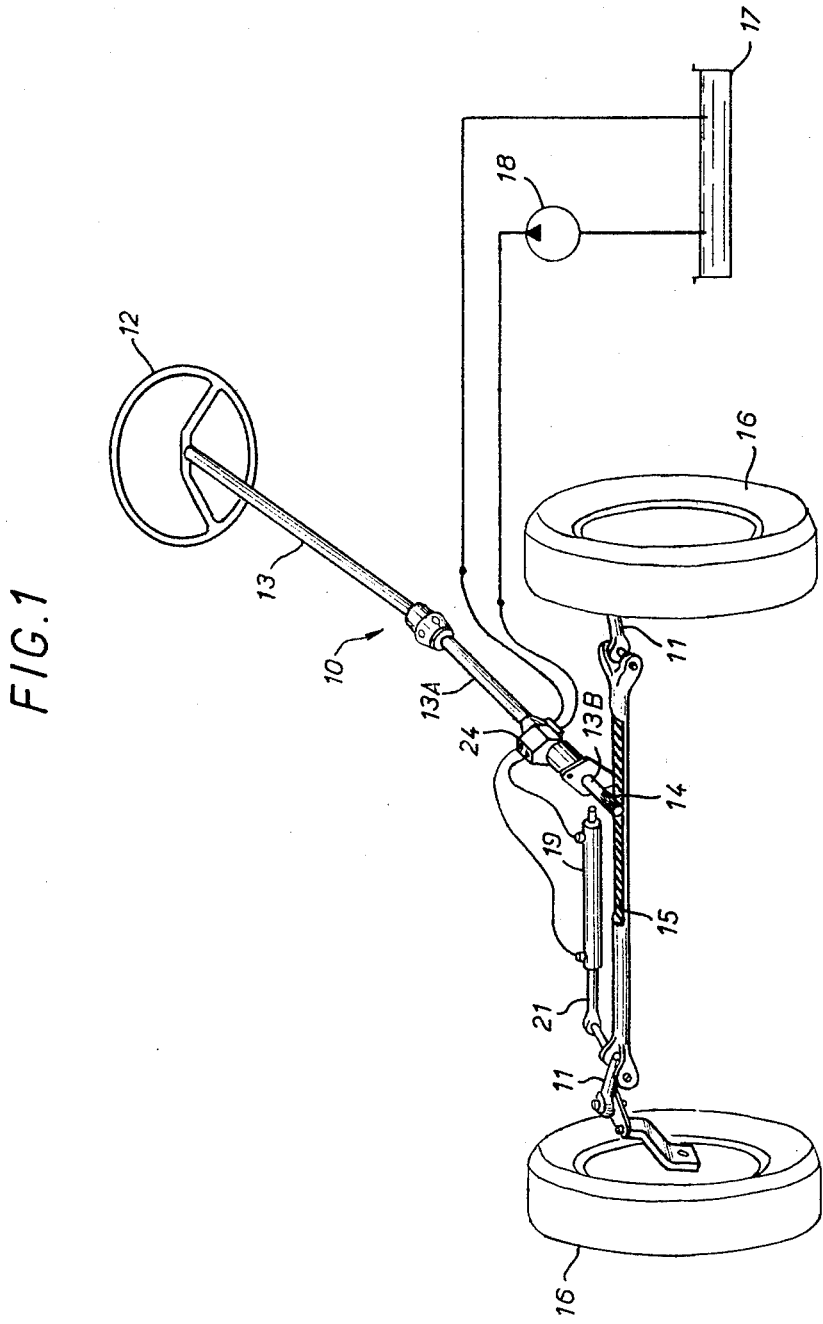
FIG. 1 is a schematic perspective view of an assisted steering device for a motor vehicle, according to the invention.
Figure 2:
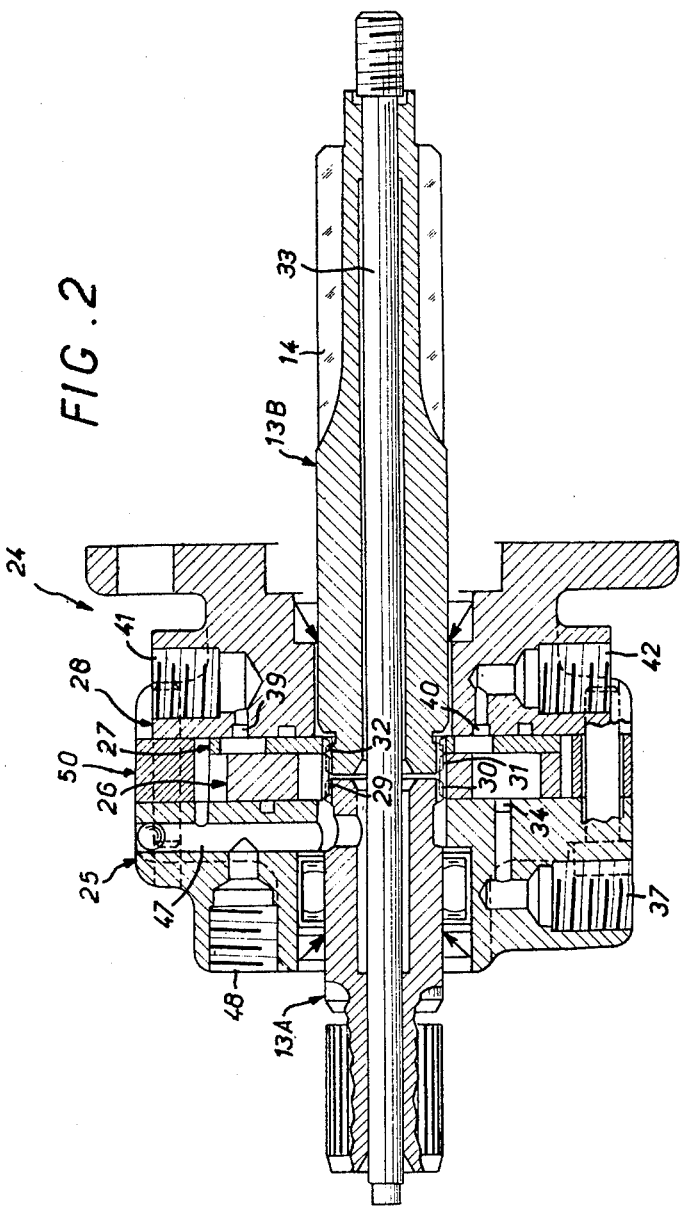
FIG. 2 is a longitudinal section through the device, on a larger scale.
Figure 3:
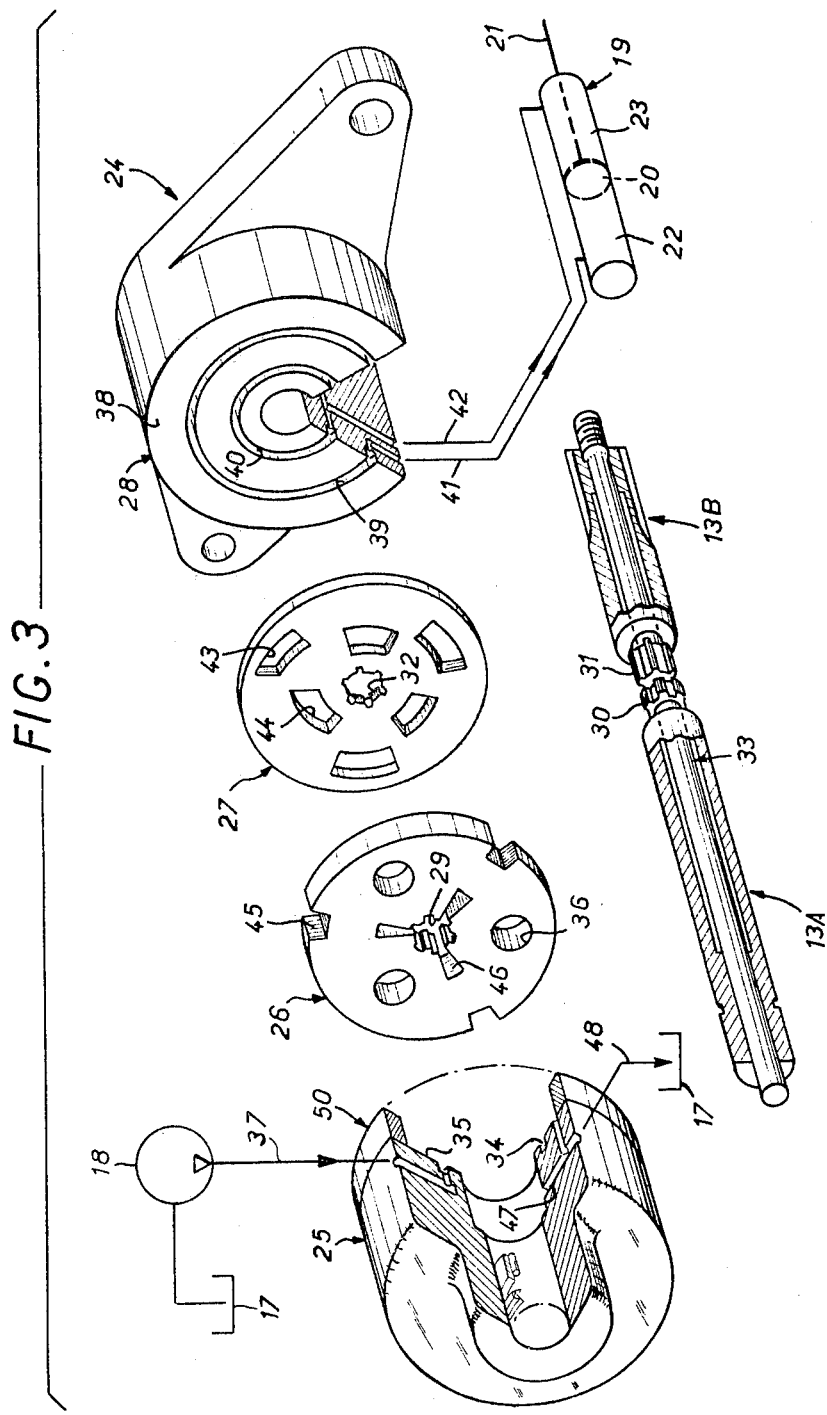
FIG. 3 is a schematic, perspective, exploded view of the device, showing the two stators and the two rotors and part of the steering column.

In the embodiment shown in FIGS. 1 to 10, an assisted steering device according to the invention is illustrated by way of example applied to a motor vehicle.

The device comprises (FIG. 1) control means 10 acting on direction changing means such as track rods 11. The control means 10 comprise a steering wheel 12 and a steering column 13. The latter has two aligned parts 13A and 13B capable of a limited relative play to permit angular offsetting between the parts 13A and 13B under the action of the control means 10. The part 13A is integral with the steering wheel 12, whilst the part 13B is integral with a pinion 14 which meshes with a toothed rack 15. The latter controls the orientation of the guiding wheels 16 of the vehicle via direction changing rods 11.

A hydraulic assistance centre 17, 18 comprises a reservoir 17 and a pump 18 drawing from this reservoir 17. A hydraulic jack 19 has a piston 20 (FIG. 3) the rod 21 of which acts on the toothed rack 15. The piston 20 defines two chambers 22 and 23 in the jack 19.

A hydraulic distributor 24 is interposed between the pump 18 and the jack 19 and is sensitive to the angular offsetting of the two parts 13A and 13B in such a manner as to make the jack 19 act on the direction changing rods 11 in the same sense as the control means.

The distributor 24 comprises an axial stack (FIGS. 2 and 3) consisting of a first stator 25, a first rotor disc 26 integral in rotation with the part 13A of the steering column, a second rotor disc 27 integral in rotation with the part 13B of the steering column, and a second stator 28.

The first disc 26 is thicker than the disc 27. It has a fluted central bore 29 engaging without angular play with a grooved bearing surface 30 of the part 13A and engaging with angular play with a grooved bearing surface 31 of the part 13B. The other disc 27 has a fluted central bore 32 engaging without play with the grooves 31 of the part 13B.

It is the play between the grooves 29 and 31 which defines the limited relative angular play mentioned above. This play is a few degrees on each side of a central rest position which tends to be found and maintained by a torsion bar 33 which elastically connects the parts 13A and 13B to each other.

An annular groove 34 (FIGS. 2, 3, 4) is provided on the surface 35 of the stator 25 adjacent to the disc 26. This disc 26 (FIG. 5) comprises a circular series of cylindrical holes 36 of circular cross section (three in the example shown) distributed over the same mean radius R as the groove 34, so as to straddle said groove (FIG. 8) and extending from one surface of the disc 26 to the other. This annular groove 34 (FIG. 3) is connected to the pump 18 by a duct 37.

The surface 38 of the second stator 28 which is adjacent to the second disc 27 (FIGS. 3 and 7) comprises two annular concentric grooves 39 and 40 which are respectively connected, via ducts 41 and 42, to the two chambers 22 and 23 of the jack 19. The second disc 27 (FIG. 6) has two circular series of cylindrical holes 43 and 44, respectively. The cylindrical holes 43 and 44 are substantially rectangular in cross section with two rectilinear radial sides T and two curvilinear circumferential sides C (FIG. 6).

The cylindrical holes 36, 43 and 44 should be taken to mean holes which are defined by a cylindrical surface, and whose cross section, perpendicular to the axis of the distributor, is circular, rectangular or otherwise, and remains constant from one end of the hole to the other, i.e. from one surface of the corresponding rotor disc to the other.

The cylindrical holes 43 of the first series (three in the example shown) are distributed over the same mean radius R1 as the groove 39, so as to straddle said groove (FIG. 8) and extend from one surface of the disc 27 to the other, whilst the cylindrical holes 44 of the second series (three in the example shown) are distributed over the same mean radius R2 as the groove 40, so as to straddle the groove (FIG. 8), and extend from one surface of the disc 27 to the other.

The various cylindrical holes 36, 43 and 44 are parallel to the axis of the device.

The mean radius R of the series of passages 36 of the first rotor disc 26, i.e. the mean radius R of the annular groove 34 of the first stator 25, has an intermediate value between the values of the mean radii R1 and R2 of the two series of passages 43 and 44, respectively, of the second rotor disc 27, i.e. the mean radii R1 and R2 of the grooves 39 and 40 of the second stator 28.

The first disc 26 (FIG. 5) has a series of outer peripheral slots 45 and a series of inner peripheral slots 46. These slots 45 and 46 are intended to permit return to the reservoir 17 (FIG. 3) via a passage 47 of the stator 25 and a duct 48.

Each of these discs 26 and 27 is produced by punching, e.g. by pressing out from sheet metal flats, with their various passages, slots and bores, thus making production particularly simple. These discs 26 and 27 are housed, with gentle friction along the three interfaces 35-26, 26-27, 27-38, between the stators 25 and 28. The axial distance between these stators 25 and 28 is kept constant by a spacing means 50, thus giving a very simple construction. The tolerance for the gentle friction is of the order of a few hundredths of a millimeter.

The arrangement of the grooves 34-39 and 40 and the passages 36, 43 and 44 over three different radii thus makes it readily possible to balance each of the disc 26 and 27 under any circumstances. Neither disc 26, 27 is ever subjected to any substantial force which would tend to urge it in one direction or the other, and this means that they are very well adapted to operate under gentle friction along the interfaces 25-26, 26-27 and 27-28.

It is merely necessary to satisfy the following conditions, which is easily done:

(1) The sum of the areas, over sections perpendicular to the axis of the distributor, of the cylindrical holes 43 is equal to the sum of the areas, over sections perpendicular to the axis of the distributor, of the cylindrical holes 44 of the second rotor disc 27.

(2) The annular groove 34 of the first stator 25 has an area, over an annular section perpendicular to the axis of the distributor, which is equal to the sum of the areas, over a section perpendicular to the axis of the distributor, of the cylindrical holes 43, which is in turn equal to the sum of the areas, over a section perpendicular to the axis of the distributor, of the cylindrical holes 44 of the second rotor disc 27.

(3) The two annular grooves 39 and 40 of the second stator 28 have the same area, over an annular section perpendicular to the axis of the distributor.

(4) The sum of the areas, over a section perpendicular to the axis of the distributor, of the cylindrical holes 36 of the first rotor disc 26 is equal to the area, over an annular section perpendicular to the axis of the distributor, of each of the two annular grooves 39 and 40 of the second stator 28.

This set of conditions makes it possible to obtain balancing for all types of functioning. When the assistance is operating, the high pressure of the station 17-18 corresponds to the desirable condition of being equal to the pressure developed in one or other of the chambers 22 and 23 of the jack 19, whereas, when the assistance is not operating, the low residual pressure of the station 17-18 corresponds to the desirable condition of being equal to the sum of the low residual pressures in the two chambers 22 and 23 of the jack 19.

In the absence of any action taken by the driver on the wheel 12, the parts 13A and 13B are held in the rest position by the torsion bar 33. FIGS. 8, 9 and 10 show how the various passages and grooves are then positioned relative to one another along the three interfaces. The delivery of the pump 18 is let in through the duct 37 into the groove 34 (FIG. 8), then reaches the passages 36, irrespective of the angular position of the rotor disc 26, and from there passes into the passages 43 and 44 (FIG. 9) which are themselves connected to the slots 45 and 46 for the return to the reservoir 18 by the passages 47 and the duct 48. Thus, the pressure of the pump has no effect in the two chambers 22 and 23 of the jack 19. The installation thus operates with an open centre and there is no stress on the jack 19.

When the driver acts on the steering wheel 112 to change the direction of the wheels 16, the parts 13A and 13B are offset relative to each other in a direction determined by the action on the wheel 12 and the relative angular position of the two discs 26 and 27 passes from the rest position shown in FIG. 9 to a position where the passages 43 markedly cover the passages 36 and markedly uncover the slots 45, whilst the passages 44 markedly uncover the passages 36 and markedly cover the slots 46.

Under these conditions, the delivery of the pump passing from the groove 34 into the passages 36 is preferentially let in by the passages 43 into the groove 39 and from there into the chamber 22 of the jack 19. This latter chamber increases in volume, pushing the rod 21 in the desired new direction. The chamber 23 of the jack 19 decreases in volume and its oil is eliminated through the duct 42 into the groove 42 and into the passages 44 which communicate with the slots 46 for the return to the reservoir 17 via the passage 47 and the duct 48.

When the driver acts on the steering wheel 12 in the other direction, the functioning is the same as described hereinbefore, but the disc 27 assumes an angular position relative to the disc 26 which is offset in the other direction relative to the rest position in FIG. 9. The delivery of the pump passes via 34, 36, 44, 40 and 42 into the chamber 23 of the jack 19 and the oil is returned from the chamber 22 to the reservoir 18 via 41-39-43-4-5-47 and 48.

If the assistance breaks down, the action on the wheel 12 in order to change direction has the effect of absorbing the limited relative angular play between the parts 13A and 13B in the teeth 29, 30, 31, 32, overcoming the elastic resistance offered by the torsion bar 33 and, thanks to the rigid connection provided by the thick disc 26 which straddles the teeth 30 and 31, it then causes the part 13B to rotate with the part 13A, thus changing direction.

It should be appreciated that the device according to the invention is particularly simple and effective in construction, and operates in a balanced manner.

It should be noted that the cylindrical holes 36, 43, 44 may have cross sections of any suitable form.

In a variant (FIGS. 11 and 12), the arrangement is analogous to that described with reference to FIGS. 1 to 10, but the rotors designated 26' and 27' also comprise in addition to the hydraulic passages 36', 43', 44', auxiliary balancing holes 60, 61, 62 which are distinct from and independent of the passages 36', 43' and 44'.

These auxiliary holes 60, 61 and 62 have the effect of improving the conditions of pressure equilibrium, which is particularly useful when the pressure of the station 18 is high.

In another variant (FIGS. 13 and 14), the arrangement is analogous to that described with reference to FIGS. 11 and 12, and the rotors designated 26" and 27" also comprise auxiliary balancing holes, but these latter holes, shown at 60', 61' and 62', consist of the hydraulic passages themselves, 36", 43" and 44", enlarged for this purpose.

As before, the balancing conditions are improved.

Figure 15:
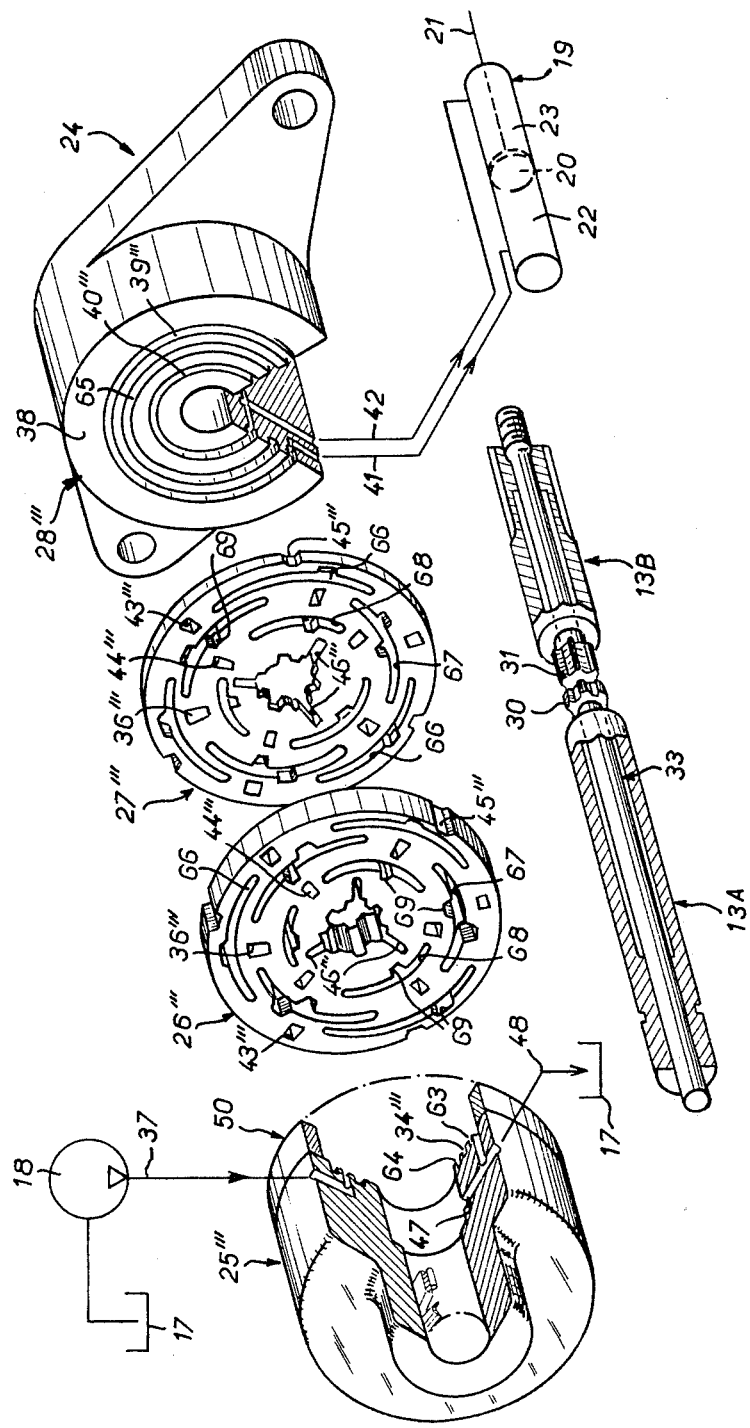
FIG. 15 is a view analogous to FIG. 3 but showing yet another variant in which the various stators and rotors have duplicated functions in order to improve the pressure equilibrium.

In yet another variant (FIGS. 15 to 18), measures are again taken to improve the conditions of pressure equilibrium, but this time by duplicating the functions of the various stators and rotors designated 25''', 26''', 27''' and 28''', thus introducing a symmetry which is favourable to the pressure balancing. The first stator 25''' is not only supplied by the hydraulic station 18 but also supplies the hydraulic jack 19. Thus, the first stator 25''' not only has the groove 34''', but also has two other grooves 63 and 64 and thus has three concentric grooves 63, 34''' and 64.

Not only does the second stator 28''' supply the jack 19, but is also supplied by the hydraulic station 18. The second stator 28''' thus not only has the grooves 39''' and 40''' but also a third groove 65, these three grooves 39''', 65 and 40''' being concentric and arranged along the same radii as the grooves 63, 34''' and 64.

The first rotor 26''' has not only the series of passages 36''' but also the two series of passages 43''' and 44''' of the other disc, and thus has a double function.

The same is true of the second rotor 27''' which comprises not only the series of passages 43''' and 44''' but also the series of passages 36''' of the first rotor. Each rotor 26''' and 27''' thus has three series of hydraulic passages 43''', 36''' and 44''' which extend over the same mean radii as the grooves 63, 34''' and 64 and the grooves 39''', 65, 40'''.

The passages of each of the three series of hydraulic passages 43''', 36''', 44''' of each rotor disc 26''' or 27''' alternate with gaps 66, 67 and 68 having widened portions 69 which co-operate with the passages of the other rotor so as to improve the conditions of pressure equilibrium. The gaps 66 provide a permanent communication between the grooves 34''' and 65. And the gaps 68 provide a permanent communication between the grooves 64 and 40'''.

It should be appreciated that each of the two rotor discs 26''' and 27''' has means for return to the reservoir 17 in the form of slots 45''' and 46''' provided in its outer and inner peripheries.

The device shown in FIGS. 15 to 18 operates analogously to that described with reference to FIGS. 1 to 10, but the various components have duplicated functions, thus providing a symmetry which improves the conditions of pressure equilibrium.

It will also be appreciated that the two discs 26''' and 27''' shown in FIGS. 16 and 17, respectively, are the same, and this also results in an improvement in the conditions of standardisation.

I claim:

1. An assisted steering device for a vehicle, comprising control means acting on direction changing means, the said control means having a transmission element in two parts which are capable of limited relative angular play permitting angular offsetting of the parts under action of the control means, and assistance means which, in response to such angular offsetting are operable to act on the direction changing means in the same sense as the control means, the said assistance means comprising a hydraulic station, a hydraulic jack acting on the said direction changing means and a hydraulic distributor interposed between the station and the jack, the said distributor comprising an axial stack consisting of a first stator, a first rotor disc integral in rotation with one of the two parts of the transmission element, a second rotor disc integral in rotation with the other part of the transmission element, and a second stator, the first stator being supplied by the said hydraulic station, the first rotor disc having a series of passages, the second rotor disc having two series of passages, and the second stator supplying the said hydraulic jack, characterised in that the passages of at least one of the two rotor discs are cylindrical holes as hereinbefore defined extending from one surface of the disc to the other and that annular groove means are provided in the surface of the stator adjacent to the said rotor disc and extending opposite the said cylindrical holes.

2. A device as claimed in claim 1, characterised in that the series of passages of the first rotor disc and the two series of passages of the second rotor disc are all circular series over three different mean radii.

3. A device as claimed in claim 1, characterised in that an annular groove is provided in the surface of the first stator adjacent to the first rotor disc and is located opposite the series of cylindrical holes of the first rotor disc and is connected to a pump of the hydraulic station, and that two concentric annular grooves are provided in the surface of the second stator adjacent to the second rotor disc and are located, respectively, opposite the two series of cylindrical holes of the second rotor disc and are respectively connected to two opposite chambers of the hydraulic jack.

4. A device as claimed in claim 1, characterised in that the circular series of passages of the first rotor disc extends over an intermediate mean radius between the mean radii over which the two circular series of passages of the second rotor disc extend.

5. A device as claimed in claim 1, characterised in that each annular groove provided in a surface of a stator adjacent to a rotor disc extends over the same mean radius as the one over which the circular series of passages of the said rotor disc extends, located opposite the said groove.

6. A device as claimed in claim 1, characterised in that an annular groove is provided in the surface of the first stator adjacent to the first rotor disc, and extends over the same mean radius as the series of cylindrical holes of the first rotor disc, and is connected to a pump of the hydraulic station, and that two concentric annular grooves are provided in the surface of the second stator adjacent to the second rotor disc, and extend respectively over the same mean radii as the two series of cylindrical holes of the second rotor disc and are connected respectively to two opposite chambers of the hydraulic jack, and that the mean radius of the annular groove of the first stator is between the mean radii of the annular grooves of the second stator.

7. A device as claimed in claim 1, characterised in that the sum of the areas, over sections perpendicular to the axis of the distributor, of the passages of one of the series of passages of the second rotor disc is equal to the sum of the areas, over sections perpendicular to the axis of the distributor, of the passages of the other series of passages of the second rotor disc.

8. A device as claimed in claim 1, characterised in that the annular groove of the first stator has an area, over an annular section perpendicular to the axis of the distributor, which is equal to the sum of the areas, over a section perpendicular to the axis of the distributor, of the cylindrical holes of the second rotor disc, which is in turn equal to the sum of the areas, over a section perpendicular to the axis of the distributor, of the cylindrical holes of the other series of cylindrical holes of the second rotor disc.

9. A device as claimed in claim 1, characterised in that the two annular grooves of the second stator have the same area, over a section perpendicular to the axis of the distributor.

10. A device as claimed in claim 9, characterised in that the sum of the areas, over a section perpendicular to the axis of the distributor, of the cylindrical holes of the first rotor disc is equal to the area, over an annular section perpendicular to the axis of the distributor, of each of the two annular grooves of the second stator.

11. A device as claimed in claim 1, characterised in that the passages of the first rotor disc are cylindrical holes of circular cross section.

12. A device as claimed in claim 1, characterised in that the passages of the second rotor disc are cylindrical holes of substantially rectangular cross section with two rectilinear radial sides and two curvilinear circumferential sides.

13. A device as claimed in claim 1, characterised in that the first rotor disc comprises means for return to a reservoir of the hydraulic station in the form of slots provided in its outer and inner peripheries.

14. A device as claimed in claim 1, characterised in that the two stators are axially fixed relative to each other and that the interfaces between the first stator and rotor, between the two rotors, and between the second rotor and stator, are effected with gentle friction.

15. A device as claimed in claim 14, characterised in that the axial distance between the two stators is maintained by a spacing means.

16. A device as claimed in claim 1, characterised in that each of the two rotor discs is of flat sheet metal.

17. A device as claimed in claim 1, characterised by means for improving the pressure equilibrium, consisting of auxiliary holes provided in the rotors.

18. A device as claimed in claim 17, chracterised in that the said equilibration holes are independent of the hydraulic passages.

19. A device as claimed in claim 17, characterised in that the said equilibration holes consist of the hydraulic passages themselves, enlarged for this purpose.

20. A device as claimed in claim 1, characterised in that the first stator not only is supplied by the hydraulic station but also supplies the hydraulic jack, whilst the second stator not only supplies the hydraulic jack but is also supplied by the hydraulic station, and the groove means of each of the stators comprise three concentric grooves, the first rotor having not only a series of hydraulic passages but also two other series of hydraulic passages, the second rotor having not only two series of hydraulic passages but also a third series of hydraulic passages, each rotor thus having three series of hydraulic passages extending respectively over the same mean radii as the three grooves of each of the stators, so as to obtain a symmetrical duplication which improves the conditions of pressure equilibrium.

21. A device as claimed in claim 20, characterised in that the hydraulic passages of each of the three series of hydraulic passages of each rotor alternate with gaps having widened portions which co-operate with the hydraulic passages of the other rotor for the purposes of equilibration.

22. A device as claimed in claim 20, characterised in that each of the two rotor discs has return means in the form of slots provided in its outer and inner peripheries.

* * * * *